Figure 6:
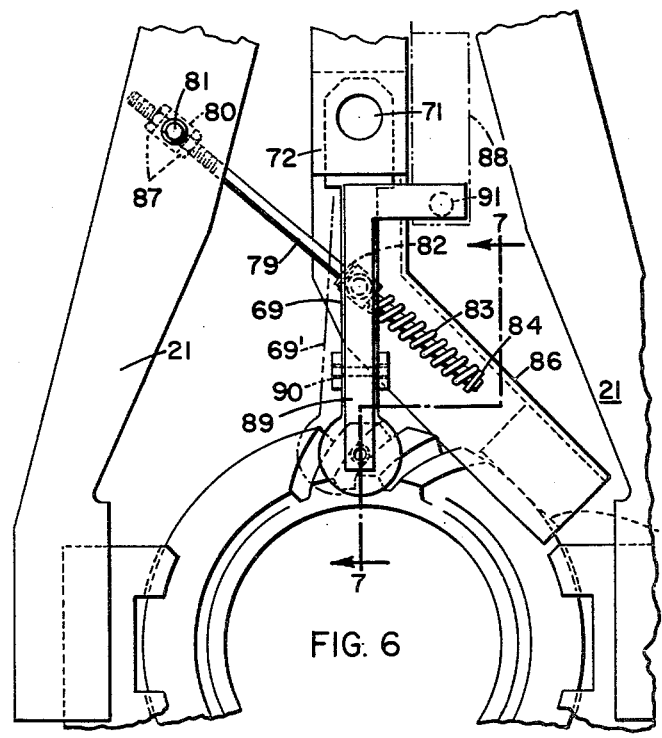

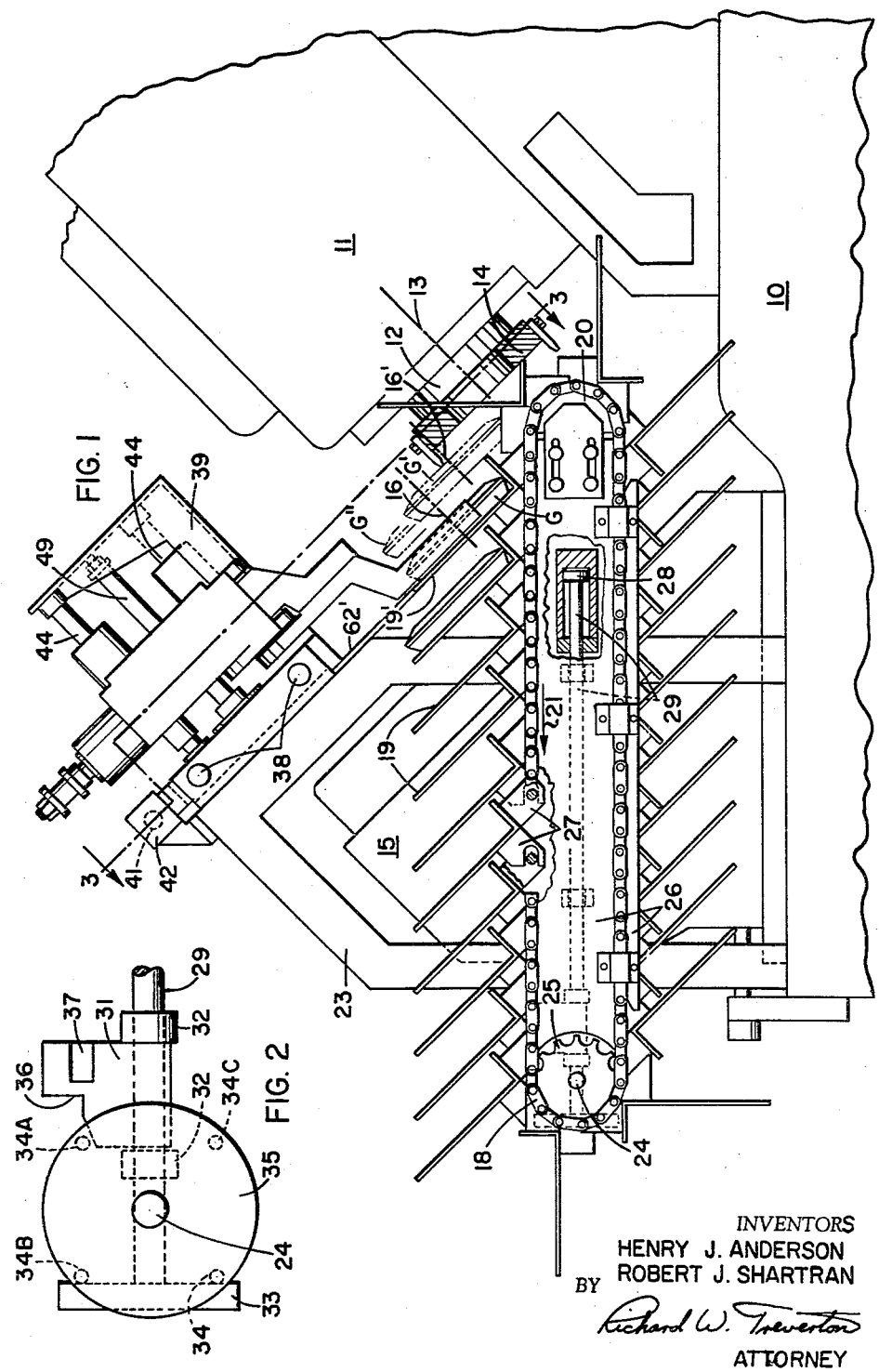
INVENTORS
HENRY J. ANDERSON
ROBERT J. SHARTRAN
BY
*Richard W. Treverton*
ATTORNEY

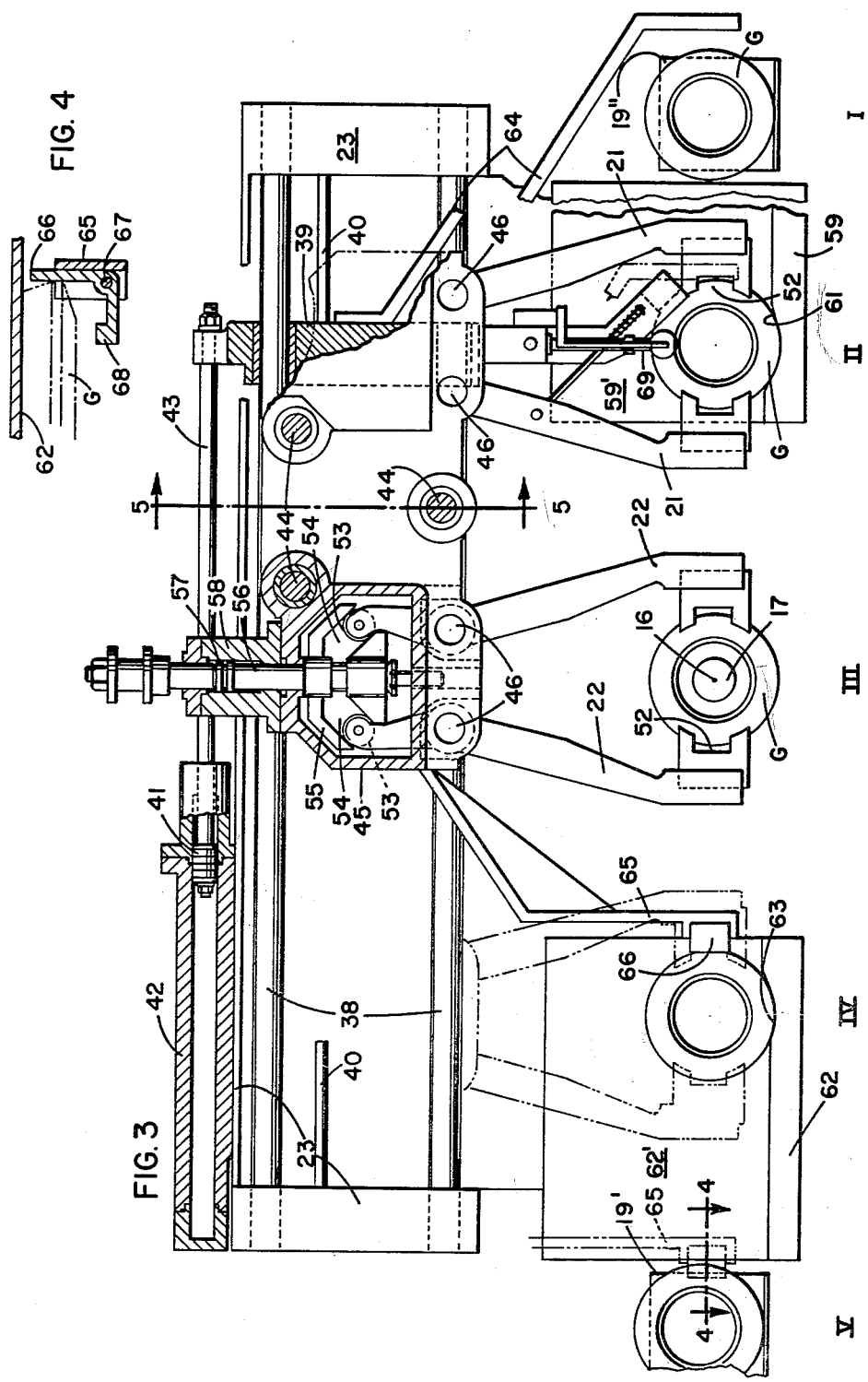

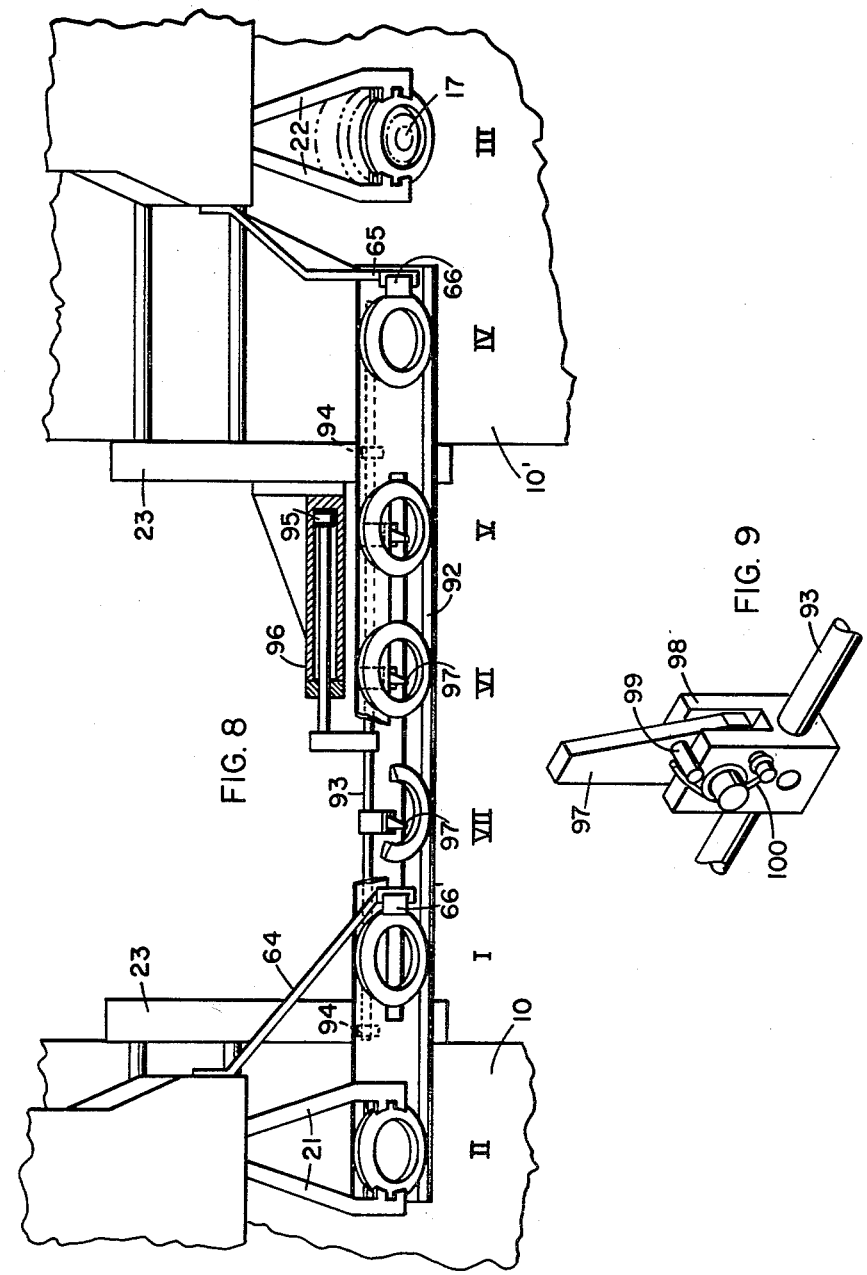

United States Patent Office 3,169,446
Patented Feb. 16, 1965

3,169,446
WORK HANDLING MECHANISM
Henry J. Anderson and Robert J. Shartrau, Rochester, N.Y., assignors to The Gleason Works, Rochester, N.Y., a corporation of New York
Filed Mar. 8, 1962, Ser. No. 178,498
15 Claims. (Cl. 90—1)

The present invention relates to a work handling mechanism, especially but not exclusively for gear cutting machines.

The primary object of the invention is a simple, compact and rugged mechanism capable of carrying a workpiece from a loading station adjacent the machine, placing it on the rotatable work support of the machine, and, at the conclusion of a tooth cutting or other work operation, removing it from such work support and depositing it at an unloading station.

A mechanism according to the invention, for a tooth cutting machine having a rotatable work holder thereon, comprises a frame, a slide reciprocable on the frame in a horizontal path perpendicular to the rotation axis of the work holder, a carriage having two sets of work gripping jaws thereon, said carriage being reciprocable on the slide in a path parallel to said axis for, on an inward stroke, placing on the work holder a workpiece held by one set of jaws, and, on an outward stroke, removing a workpiece from the work holder by means of the other set of jaws, rails on the frame substantially parallel to said horizontal path for guiding workpieces for movement therealong substantially in the plane of a workpiece on the work holder, and arms on the slide movable in unison therewith for so moving workpieces along said rails concomitantly with each stroke of the slide in one direction, said arms being arranged respectively to engage and move one workpiece from a receiving station to a loading station and another workpiece from an unloading station to a discharge station while the slide carries one set of jaws from alignment with the loading station into alignment with said axis and carries the other set of jaws from alignment with said axis into alignment with said unloading station.

In the case of a machine for finish cutting or other operation on workpieces whose tooth spaces have been formed previously, means must be provided to stock-divide the workpiece, i.e. to place it on the work support of the machine with a tooth slot thereof aligned with the cutter or other tool. For this purpose, the work handling mechanism of the invention may comprise a jaw support, a set of jaws on the support, at least one jaw member of said set being movable on the support to grip and center a workpiece between the jaws, an arm movable on the support, a pin carried by the arm for entry into a tooth space of a workpiece between the jaws, and means operable for moving the arm while a workpiece is between the jaws but has not yet been gripped thereby, to cause the pin to enter a tooth slot, and, upon continuing motion of the arm, rotate the workpiece to bring the slot into predetermined relation to the support.

Figure 7:
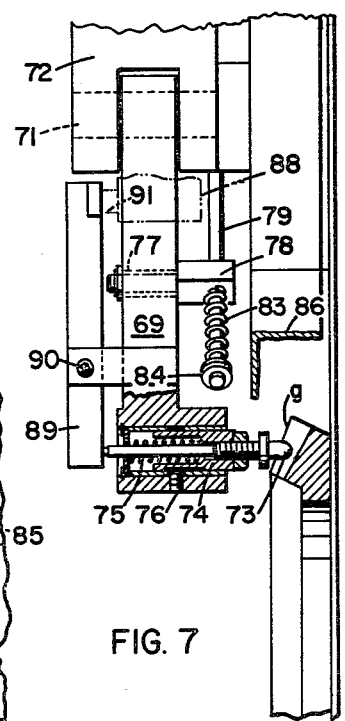
Figure 5:
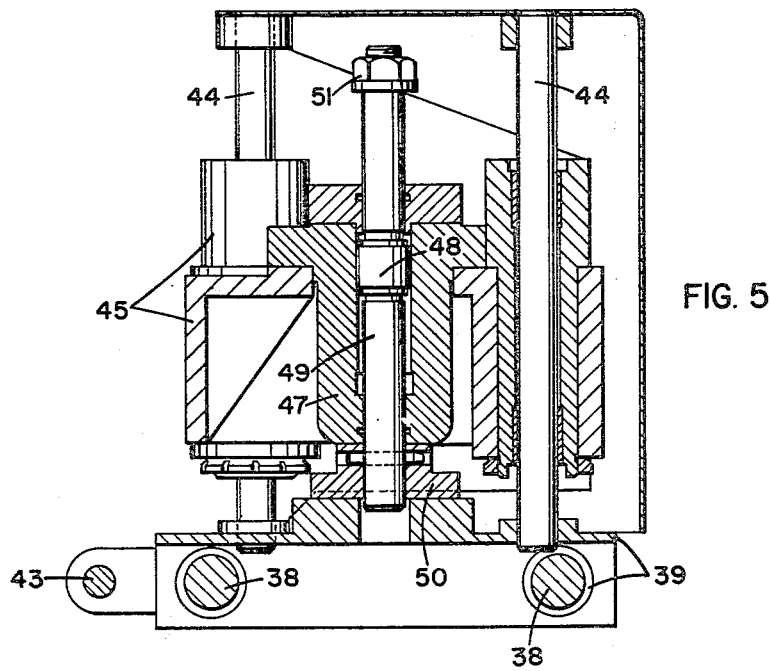

Preferred embodiments of the invention are shown in the accompanying drawings, wherein:

FIG. 1 is a side elevation of the work handling mechanism and the related parts of the gear cutting machine;
FIG. 2 is a detail view, also in side elevation, of a ratchet mechanism for a magazine appearing in FIG. 1;
FIG. 3 is a view of the loader perpendicular to FIG. 1 and inclined at forty-five degrees to the horizontal, with parts in section in approximately the planes indicated by section line 3—3 in FIG. 1;
FIGS. 4 and 5 are sections respectively in planes 4—4 and 5—5 of FIG. 3;

FIG. 6 is a view in the same direction as FIG. 3, showing the stock-dividing mechanism on a larger scale;
FIG. 7 is a view perpendicular to FIG. 6, partly in section 7—7 of FIG. 6;
FIG. 8 is a plan view of a transfer mechanism arranged between rough and finish cutting gear machines; and,
FIG. 9 is a bottom isometric view of a pawl mechanism which appears in FIG. 8.

The gear cutting machine shown in FIG. 1 may be of the general kind disclosed in application Serial No. 87,315, filed Feb. 6, 1961, by H. A. Male. It comprises a frame 10 supporting a cutter head 11 in which a cutter spindle 12 with face mill cutter 14 thereon is journaled for rotation about axis 13 and also for motion along that axis. The machine frame also supports a horizontal slide 15 supporting a work spindle for indexing or step-by-step rotation about its axis 16, the spindle having secured thereto a hydraulically operable work holding device 17, FIGS. 3 and 8, of the expanding arbor type, for supporting a workpiece which in this case is a spiral bevel or hypoid ring gear G. In FIG. 1 the gear G is shown in full lines in its position on the arbor when the slide 15 is withdrawn to its limit position to the left. Upon movement of the slide to its opposite limit position the gear is advanced to cutting position, shown in broken lines at G', its axis then being at 16'. While in this position a tooth slot is cut by cutter 14, which may advance axially while cutting. The workpiece is then indexed about its axis prior to cutting of the next slot, such indexing in the case of rough cutting from the solid being preceded by an axial withdrawal of the cutter, or, in the case of finish cutting, by a gap between cutting blades coming abreast of the work.

The work handling mechanism includes an unloading magazine disposed at one side of the machine, this magazine comprising an endless chain 18 having thereon a plurality of work holders 19 and being arranged to index or advance step-by-step in the direction of arrow 21 to carry workpieces successively from the magazine receiving station (at the position of the work holder designated 19') to which they are brought from the arbor 17 by a transfer device. The work handling mechanism further includes a loading magazine, of essentially the same construction, disposed on the opposite side of the machine. The loading magazine is adapted to advance stepwise in the opposite direction, i.e. left to right in FIG. 1, to successively bring workpieces to a magazine delivery station represented by work holder 19", FIG. 3, from which they are carried by the transfer device to the arbor 17.

Referring especially to FIG. 3, the work transfer device includes means to simultaneously (a) advance a gear G from the magazine delivery station I on work holder 19" (this being the receiving station of the transfer device) to a loading station II, (b) advance another gear G at station II to arbor 17 at work station III, (c) advance a gear at station III to unloading station IV, and (d) advance a gear at station IV to the unloading magazine delivery station V on work holder 19' (this being the discharge station of the work transfer device). During each of the transfers (b) and (c) the gear is first gripped by loader jaws 21 or unloader jaws 22, then moved axially, as between position G and position G" in FIG. 1, then moved laterally from station II to station III, or from station III to station IV, and then moved axially in the opposite direction, as from G" to G in FIG. 1, and finally being released by the jaws. These axial motions are necessary to place a gear on the arbor 17 and to remove it therefrom. By reason of the arrangement described, with intermediate stations II and IV between the work station III and the terminal stations I and V, the stroke of the work transfer mechanism for effecting the advance from station I to station V is much shorter than it would be by direct transfer between stations I and III and between stations III and V. The shorter stroke permits faster operation and a more compact and rigid construction.

The work handling mechanism comprises a frame 23 secured to machine frame 10 and rotatably supporting shafts 24 of drive sprockets 25 for the chains 18. Each magazine has two such chains, one behind the other in FIG. 1. The chains are further supported by rails 26 on the frame, the upper of these rails having adjustable semi-circular chain guides 20. As shown, the work holders 19 are of L-shape and are pivoted by lugs 27 to the link-pivoting pins of the chains. Each magazine is actuated by a hydraulic piston 28 reciprocable in a cylinder secured to the frame 23. The piston rod 29 has a pawl 31, FIG. 2, pivoted thereon between two collars 32 affixed to the rod and suitably weighted to bias it to operative position. The piston rod also has at the end thereof a cross-head 33 held against rotation about the axis of the rod by a suitable guide, not shown. The cross-head as well as the pawl is engageable with pins 34 which project from one face of a disc 35 secured to the adjacent sprocket shaft 24. Upon each stroke of piston 28 to the left in FIG. 2, surface 36 of the pawl engages the pin designated 34A and moves it through an angle of ninety degrees about the axis of the shaft to the position of the pin designated 34B. Upon the return stroke of the piston, a cam surface 37 of the pawl rides on the pin then at 34A, pivoting the pawl about rod 29 sufficiently to pass the pin. At the conclusion of this stroke the cross-head engages the pin at 34B, and the pin therebeneath, to hold the disc against movement. Thus on each reciprocation of the piston the magazine is advanced by one step in the direction of arrow 21, to bring an empty work holder to position 19'. The actuating mechanism illustrated in FIG. 2 is for the unloader magazine; that for the loader magazine is similar except that the pawl is inverted, to engage the pin 34 designated 34C instead of that designated 34A, so as to operate the magazine in the opposite direction.

Referring to FIGS. 1, 3 and 5, the frame 23 includes parallel transverse guide rods 38 supporting a slide 39 for movement back and forth therealong by a hydraulic piston 41. The latter is reciprocable in a cylinder 42 mounted on the frame 23 and is connected to the slide by a piston rod 43. Stops 40 on frame 23 limit the stroke of the slide. The slide has rigidly secured thereto three guide rods 44 for a carriage 45 to which the aforementioned work gripping jaws 21 and 22 are pivoted by pins 46. The carriage is moved along rods 44, which are parallel to work spindle axis 16, by a hydraulic piston-cylinder device of which the cylinder 47 is a part of the carriage while the piston, 48, is secured to the slide 39 by its piston rod 49 and a plate 50 that is pinned to the lower end of the rod. A nut 51 on the upper end of the piston rod limits upward motion of the carriage. The downward limit position, determined by abutment of cylinder 47 with plate 50 on slide 39, brings the jaws, 21 or 22, into alignment with a gear on the arbor, i.e. a gear in the full line position G in FIG. 1 and at station III in FIG. 3.

As shown, the outer ends of the jaw members have recesses 52 substantially complementary to the gears so that when the jaws are closed they will firmly grip a gear aligned with axis 16 or center it for alignment with that axis. The inner ends of the jaw members 22, within carriage 45, carry rollers 53 adapted to ride in inclined slots 54 in a block 55, the latter being carried by the rod 56 of a hydraulic piston 57 that is reciprocable in a cylinder 58 secured to the carriage. The arrangement is such that as the piston and block move upwardly the rollers 53 are moved apart, closing the jaws 22 upon the gear, the condition shown in FIG. 3, and that upon downward motion of the piston and block the jaws are opened to release the gear. As indicated by the drawings, the same kind of actuating means are provided for the jaws 21.

A rail 59 on frame 23 guides gears between station I and station II, the latter being defined by a trough 61 in the rail. A like rail, 62, with a trough 63 at station IV, guides gears between the latter station and station V. Advance of a gear from station I to station II is effected upon motion of slide 39 to the left, by an arm 64 rigidly secured to the slide. Simultaneously an arm 65, also rigid with the slide, is adapted to move a gear from station IV to station V. Arm 65 has a gear-engaging pawl 66, pivoted thereto by a pin 67 as shown in FIG. 4, to allow it to pass a gear at station IV on the return stroke of the slide. The pawl is weighted, as indicated at 68, to bias it to operative position. Because the pawl must move past the gear before it can pivot back to operative position, the center-to-center distance between gears at stations IV and V must be somewhat less than the stroke of piston 41, this stroke being equal to the center-to-center distance between gears at stations III and IV, and between those at stations II and III. The rails 59 and 62 are of substantially L-shape in cross-section, the parts 59' and 62' thereof which contact the back faces of the gears being substantially aligned with the corresponding part of work holder 19' (and also of work holder 19") as will be understood from FIG. 1.

To operate the work handling mechanism hydraulic pressure is applied between the pistons 28, 41, 48, 57 and their respective cylinders by solenoid operated valves controlled by limit switches, not shown, associated with the mechanism and with the gear cutting machine itself. This control system, which forms no part of the present invention, is arranged to effect the following sequence of operations after the withdrawal of slide 15 at the conclusion of the cutting of each gear: (a) cylinder 47 (for piston 48) and carriage 45 are lowered to bring the jaws 21, 22 into the plane of gear at stations II and III; (b) pistons 57 (of both sets of jaws) are raised to close the jaws on the gears at these stations; (c) cylinder 47 is raised to lift the gear at station II and to strip the gear at station III from arbor 17; (d) piston 41 and slide 39 are moved to the left, to align the gear in jaws 21 with axis 16 at station III, transfer the gear in jaws 22 to station IV, and transfer gears at stations I and IV respectively to stations II and V; (e) cylinder 47 is moved downwardly, to place the gear in jaws 21 on arbor 17 and deposit the gear in jaws 22 on rail 62, 62'; (f) arbor 17 is expanded to grip the gear that has been placed thereon; (g) pistons 57 are raised to open both sets of jaws; (h) cylinder 47 is raised to elevate the jaw carriage; (i) piston 41 and slide 39 are returned to their right limit position (in FIG. 3); and (j) the pistons 28 of both the loading and the unloading magazines are reciprocated to advance gears respectively to station I and from station V.

In the case of a gear finishing machine, roughed or pre-slotted gears delivered by the loading magazine must be stock-divided to align a tooth slot with the cutter 14. For this purpose there is associated with the jaws 21 of the work handling mechanism of the gear finisher (but not those of the gear rougher) the stock-divider shown in FIGS. 3, 6 and 7. The divider comprises an arm 69 pivoted at 71 to member 72 of jaw carriage 45 and carries a pin 73 adapted for entry into a tooth slot of the gear G. The pin is adjustably screw-threaded to a plunger 74 backed by a spring 75 and slidable in a bushed bore in the arm. A key 76 holds the plunger against rotation and limits its travel. Pivoted at 77 to the arm is a block 78 in which a rod 79 is slidable, the rod being connected to a block 80 which is pivoted at 81 to one of jaws 21 and has a fixed collar 82 for abutment with block 78. A coil spring 83 on the rod, disposed between block 78 and another collar 84 fixed on the rod, acts to urge the latter against collar 82.

When the jaws 21 are open the arm 69 is in the broken line position shown at 69' in FIG. 6. As they close on a gear at station II the rod 79 causes the arm to swing about its pivot 71. During such motion the pin 73, if not already in a tooth slot but on the top face g of the gear, FIG. 7, drops into full depth in such slot under the pressure of spring 75. The continuing motion of the arm as the jaws close then rotates the gear about its axis to bring the slot to a predetermined position. The gear during such rotation bears against and is held centered by trough 61 of rail 59 and a bearing block 85 supported by extension 86 of the carriage 45. The final position of rotation of the gear may be adjusted to accurately align the tooth slots of the gear with cutter 14 by adjusting the effective length of the rod 79 between pivot 81 and collar 82. This may be accomplished by the adjustment of nuts 87 which are screw-threaded to rod 79 and clamp it to block 80. The pin 73 remains in the tooth slot while the gear is being placed on the arbor 17, which as explained at (f) in the second preceding paragraph, grips the gear prior to the opening, and, subsequently, the raising of the jaws. Opening of the jaws while the pin remains in the slot is permitted by yielding of spring 83 which allows the rod 79 to move relative to arm 69.

Preferably a limit switch 88 is provided to discontinue operation of the work handling mechanism in the event faulty stock division prevents pin 73 from reaching the intended depth in the tooth slot, as shown in FIG. 7. A lever 89 pivoted at 90 to arm 69 has one end engageable by pin 73 and its opposite end engageable with the spring-backed actuating stem 91 of the switch. Failure of the pin 73 to reach the intended depth prevents stem 91 from moving far enough to the left, in FIG. 7, to effect the closure of the switch contacts that is necessary for further operation of the mechanism.

A modification shown in FIG. 8 provides for automatic transfer of gears from a roughing machine, whose frame is designated 10', to the finishing machine whose frame is 10. The transfer mechanism replaces the unloading magazine of the gear roughing machine and the loading magazine of the finishing machine. A rail 92 of L-shape in cross-section extends between and is supported by the loader frames 23 of the two machines, the rail serving to guide gears from station V of the roughing machine to station I of the finishing machine. As before, the jaws 22 convey gears from arbor 17 (station III) to station IV of the rougher, and arm 65 pushes them from station IV to station V. Also, as before, the arm 64 of the finisher pushes gears from station I to station II where they are picked up by the finisher jaws 21. However in this instance the arm 64 has a pivoted finger 66', like finger 66 of arm 65, to allow it to pass by a gear at station I on its return stroke, to the right in FIG. 8.

For moving the gears from roughing station V to finishing station I, through successive interim positions VI and VII, the transfer mechanism now to be described is provided. It comprises a bar 93 parallel to rail 92 and supported for reciprocation thereby in bearings indicated at 94, such reciprocation being effected by a piston 95 operable in cylinder 96 secured to frame 23. Pawls 97 are pivoted to brackets 98 on bar 93 for pivotal motion, clockwise in FIGS. 8 and 9, to allow the pawls to pass over gears during return strokes of the bar 93, to the right, but are prevented by abutment of a pin 99 with bracket 98 from pivoting during the gear advancing stroke of the bar. A light spring 100 is preferably provided to urge the pin 99 into such abutting position. The brackets are so arranged on the bar that the fingers engage in the bore of the gears. The control system includes means, not shown, to coordinate operation of the two machines and their work transfer mechanisms (jaw carriages) with a reversing valve for so controlling the application of fluid pressure to cylinder 96 that in normal operation the two pistons 41 and the piston 95 will operate substantially in unison.

Having now described the preferred embodiments illustrated and explained their operation, what we claim as our invention is:

1. A work handling mechanism, for a tooth cutting machine or the like having a rotatable work holder thereon, comprising a frame, a slide reciprocable on the frame in a horizontal path perpendicular to the rotation axis of the work holder, a carriage having two sets of work gripping jaws thereon, said carriage being reciprocable on the slide in a path parallel to said axis for, on an inward stroke, placing on the work holder a workpiece held by one set of jaws, and, on an outward stroke, removing a workpiece from the work holder by means of the other set of jaws, rails on the frame substantially parallel to said horizontal path for guiding workpieces for movement therealong substantially in the plane of a workpiece on the work holder, and arms on the slide movable in unison therewith for so moving workpieces along said rails concomitantly with each stroke of the slide in one direction, said arms being arranged respectively to engage and move one workpiece from a receiving station to a loading station and another workpiece from an unloading station to a discharge station while the slide carries one set of jaws from alignment with the loading station into alignment with said axis and carries the other set of jaws from alignment with said axis into alignment with said unloading station.

2. A mechanism according to claim 1 in which at least one of said arms has a pawl for engaging and advancing a workpiece upon each stroke of the slide in one direction, said pawl being pivoted to the arm for idly passing a workpiece during return strokes of the slide.

3. A mechanism according to claim 1 in which there is a magazine comprising a plurality of work holders and means to advance them step-by-step, said magazine being so positioned relative to said frame that a work holder in one position of such advance is at one of said receiving and discharge stations.

4. A pair of mechanisms as defined in claim 1 for roughing and finishing gear cutting machines arranged with their rotatable work holders parallel to each other and positioned to hold gears in substantially the same plane transverse of their rotation axes, wherein the rail of the finishing machine for supporting a workpiece at the loading station and the rail of the roughing machine for supporting a workpiece at the unloading station together form a continuing rail structure between the two machines, and wherein there are means for traveling workpieces along said rail structure from the discharge station of the roughing machine to the receiving station of the finishing machine.

5. A mechanism according to claim 1 in which there is an actuator for opening and closing one pair of jaws, an arm movable on the carriage and having a pin adapted for contact with the toothed face of a work gear between said set of jaws and for entry into a tooth slot of the gear, and a connection between one jaw member of the set and said arm for moving the latter as the jaws close to effect such entry of the pin and, by continuing movement, to rotate the gear to bring the tooth slot into a predetermined relation to the carriage.

6. A mechanism according to claim 5 in which said pin is movable relative to said arm for entry into the tooth slot, and there are spring means urging such motion.

7. A mechanism according to claim 5 in which said arm is pivoted to the carriage, and said connection between the jaw member and the arm is yieldable upon jaw opening motion to enable the pin to remain in the tooth slot during such opening motion.

8. A machine tool having a rotatable work holder for supporting a workpiece at a work station, a slide reciprocable in a path perpendicular to the rotation axis of the work holder, a carriage reciprocable on the slide in a path parallel to said axis, said carriage having a plurality of sets of jaws mounted thereon, each of said sets being adapted to engage a workpiece at the work station in one poistion of reciprocation of the side, an indexable loading magazine for bringing workpieces successively to the machine, a support for a workpiece at a loading station between the loading magazine and the work station, the slide having an arm adapted to engage a workpiece on the loading magazine and, upon motion of the slide, move the workpiece from the loading magazine to the loading station, said support being so disposed that a workpiece thereon is engageable by one set of jaws while another set of jaws is engageable with a workpiece at the work station.

9. A machine tool having a rotatable work holder for supporting a workpiece at a work station, a slide reciprocable in a path perpendicular to the rotation axis of the work holder, a carriage reciprocable on the slide in a path parallel to said axis, said carriage having a plurality of sets of jaws mounted thereon, each of said sets being adapted to engage a workpiece at the work station in one position of reciprocation of the slide, an indexable unloading magazine for carrying workpieces successively away from the machine, a support for a workpiece at an unloading station between the work station and the unloading magazine, the slide having an arm which is adapted to engage a workpiece at the unloading station and, upon motion of the slide, move the workpiece from the unloading station to the unloading magazine, said support being so disposed that a workpiece thereon is engageable by one set of jaws while another set of jaws is engageable with a workpiece at the work station.

10. A work handling mechanism, for a machine having a rotatable work holder at a work station, comprising a transfer device for carrying toothed workpieces from a loading station to the work station, said transfer device having a set of jaws thereon, and a stock-dividing member movable on said transfer device to effect stock-dividing rotation of a workpiece at said loading station prior to gripping thereof by said jaws, and means for closing said jaws and concomitantly operating said stock-dividing member, said stock-dividing member being provided with a pin for entering a tooth space of said workpiece and rotating the workpiece into a predetermined angular position between the jaws prior to gripping of the workpiece by the jaws.

11. A work handling mechanism, for a machine having a rotatable work holder at a work station, comprising a transfer device having jaws for gripping and carrying a toothed workpiece from a loading station to the work station, an element movable on the transfer device for opening and closing the jaws, a stock-dividing member having a pin for entering into a tooth space of said workpiece, the stock-dividing member being movable on said transfer member to cause said pin to move over the workpiece at the loading station to assure entry of the finger into a tooth space of the workpiece and to then rotate the workpiece into a predetermined angular position between the jaws prior to gripping of the workpiece by the jaws, and a connection between one member of said jaws and said stock-dividing member for operating the latter upon jaw-closing motion.

12. A handling mechanism for toothed workpieces comprising a jaw support, a set of jaws on the support, at least one jaw member of said set being movable on the support to grip and center a workpiece between the jaws, an arm movable on the support, a pin carried by the arm for entry into a tooth space of a workpiece between the jaws, and means operable concomitantly with closing movement of the jaws for moving the arm while a workpiece between the jaws has not yet been gripped thereby, to cause the pin to enter a tooth slot, and, upon continuing motion of the arm, rotate the workpiece to bring the slot into predetermined relation to the support.

13. A mechanism according to claim 12 having bearing means supporting the gear for such rotation.

14. A mechanism according to claim 12 in which said means comprises a connection between said jaw member and the arm, for effecting said motion of the arm by and during jaw-closing motion.

15. A mechanism according to claim 14 in which there is an actuator for opening and closing one pair of jaws, an arm movable on the support and having a pin adapted for contact with the toothed face of a gear between said set of jaws and for entry into a tooth space of the gear, and a connection between one jaw member of the set and said arm for moving the latter as the jaws close to effect such entry of the pin and, by continuing movement, to rotate the gear to bring the tooth slot into a predetermined relation to the support.

References Cited in the file of this patent

UNITED STATES PATENTS

| 1,575,185 | Stenhouse | Mar. 2, 1926 |
| 1,829,263 | Carlsen | Oct. 27, 1931 |
| 1,933,225 | Smith | Oct. 31, 1933 |
| 2,304,148 | Carlsen | Dec. 8, 1942 |
| 2,725,792 | Wildhaber | Dec. 6, 1955 |
| 2,733,641 | Praeg | Feb. 7, 1956 |
| 2,736,238 | Moncrieff | Feb. 28, 1956 |
| 2,739,693 | Ames | Mar. 27, 1956 |
| 2,782,689 | Carlsen et al. | Feb. 26, 1957 |
| 2,834,258 | Anderson et al. | May 13, 1958 |
| 2,926,801 | Fouse | Mar. 1, 1960 |
| 2,932,376 | Millington | Apr. 12, 1960 |
| 2,947,223 | Carlsen et al. | Aug. 2, 1960 |
| 2,981,398 | Peras | Apr. 25, 1961 |